United States Patent [19]

Hollemann

[11] 4,301,859

[45] Nov. 24, 1981

[54] HOT WATER SURFACE HEATING DEVICE

[76] Inventor: Karl Hollemann, Laubaner Strasse 10, 3207 Harsum 1, Fed. Rep. of Germany

[21] Appl. No.: 39,009

[22] Filed: May 14, 1979

[51] Int. Cl.³ .......................... F28D 19/00; F28F 3/00
[52] U.S. Cl. .................................................... 165/49
[58] Field of Search ...................... 165/49, 168; 237/69

[56] References Cited

U.S. PATENT DOCUMENTS

| | | | |
|---|---|---|---|
| 1,740,336 | 12/1929 | Crittal et al. | 237/69 |
| 2,559,198 | 7/1951 | Ogden | 237/69 |
| 2,621,027 | 12/1952 | Tatsch | 165/49 |

FOREIGN PATENT DOCUMENTS

| | | | |
|---|---|---|---|
| 1964395 | 10/1971 | Fed. Rep. of Germany | 165/49 |
| 2509841 | 9/1976 | Fed. Rep. of Germany | 237/69 |
| 2618621 | 10/1977 | Fed. Rep. of Germany | 237/69 |
| 2603441 | 11/1977 | Fed. Rep. of Germany | 237/69 |
| 871251 | 1/1942 | France | 237/69 |
| 52-9951 | 1/1977 | Japan | 165/49 |
| 52-9952 | 1/1977 | Japan | 165/49 |
| 52-9953 | 1/1977 | Japan | 165/49 |
| 404826 | 1/1934 | United Kingdom | 237/69 |

Primary Examiner—Stephen P. Garbe
Attorney, Agent, or Firm—Allison C. Collard; Thomas M. Galgano

[57] ABSTRACT

A hot water surface heating device that includes a plurality of coupled individually-prefabricated, plate-like assemblies, each of which includes a base plate, a cover plate and at least one plastic pipe disposed between the base plate and the cover plate. The plates each having a reinforcing layer and an inner surface opposing the inner surface of the other plate provided with at least one channel for the partial receipt therein of the pipe. The heating device is extremely thin and is especially suitable for installation in old buildings.

16 Claims, 6 Drawing Figures

Section A-B

HOT WATER SURFACE HEATING DEVICE

The present invention relates to a multi-layered, hot water heating device. More particularly, it relates to such a device which includes plastic pipes for feeding the hot water which are mounted between structural reinforcement layers.

German laid open Pat. No. 26 18 621 discloses a hot water surface heater which is installed in floors and which is characterized by a low construction height and low surface weight. This heating device is particularly suitable for previously-existing living areas or spaces, since the restoration of old buildings is of ever increasing importance. A further hot water floor heating device, which has an even lower construction height, is disclosed in Austrian Pat. No. 312,835. In this embodiment, plastic pipes are mounted within a floating floor finish having a minimum thickness of 50 mm. In order to absorb the bending, tensile and rupture stresses which mainly have an effect on the floating floor, the heating or cooling pipes are limited to an outer cross-section of 20–22 mm, and a construction steel mat is used having a mesh width or core cross-section of about between 2 and 5 mm; the distance of the construction steel mat from the adjacent plane (surface) of the floating floor finishing being at least 3 mm. However, in both of the aforementioned embodiments, it is not possible to install the heating device in old buildings (for example, during restoration) without encountering some problems.

It is, therefore, an object of the present invention to provide a hot water surface heater of the aforementioned type which can be installed in existing rooms without any difficulties.

It is a more particular object of the invention to provide a heating device having a very reduced layer thickness which is very well below the known and conventional embodiments.

These and other related objects of the invention are attained by the provision of a heating device which consists of interconnected individual, prefabricated, plate-like portions consisting of a base plate and a cover plate, which plates both have opposing profiled inner surfaces for receiving plastic pipes therebetween. It is advantageous to couple the adjacent base and cover plates at their edges with interengaging tongue-and-groove couplings. A further favorable coupling is possible by offsetting the cover plates with respect to their associated base plates; this results in the formation of circumferentially-disposed steps which may be riveted and/or bonded together.

For providing surface heaters of particularly thin layer thickness, which is of particular importance when installing the heating device in existing structures, the mat reinforcement layer should have a mesh width or core cross-section of less than 2 mm and, preferably, only 0.5 to 1.3 mm. Thereby, the ratio of the mesh width may be 1:2 to 1:3, relative to the mesh length, based on a short side of about 0.5 to 0.8 cm. In view of the relatively thin thickness, the mat threads may be interwoven with respect to each other or welded together. The distribution of the thread distances in the X-Y direction (i.e., in the plane of the plates) provides an optimum uniform heat distribution from the pipes into the plates, and an optimum distribution or adjustment of the bending strength of, and point stresses applied to, the floor. This distribution is of critical importance with the extremely thin layer structure.

The following layer structure has been proven to be favorable for low total thickness:

The outer cover layers are shaped from a fine sand floor finishing material. Below this is a floor finishing material with added solid foam, while the bonding layer (floor bonding material) is epoxy resin, for example, which forms the center layer between the two superimposed plates. Preferably, the bonding layer may consist of polyurethane.

In order to simplify the transport of the prefabricated plates, it is particularly advantageous to add an elastic, plastic emulsion to the floor finishing material. This provides each plate with sufficient elasticity to prevent breakage during transport. For extremely high surface loads, the floor surface may be strengthened with a glass fiber which is immersed in a laminating resin. It had been found to be advantageous to use an even number of pipe strands for each prefabricated plate portion.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings, wherein similar reference characters denote similar elements throughout the several views.

Figure 1:
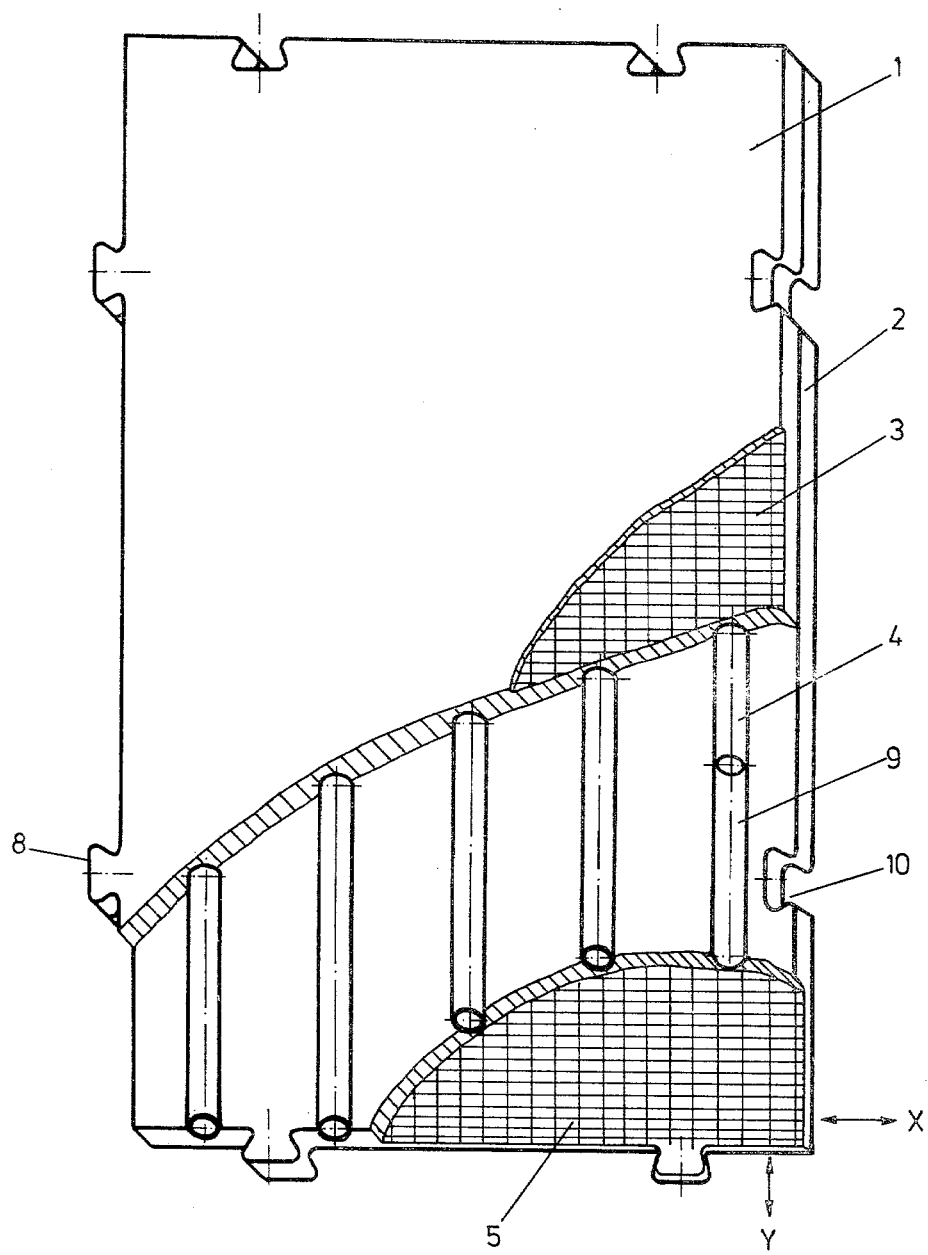
FIG. 1 is a top view, in part section, of a plate-like part, employed in the surface heater embodying the present invention.
Figure 2:
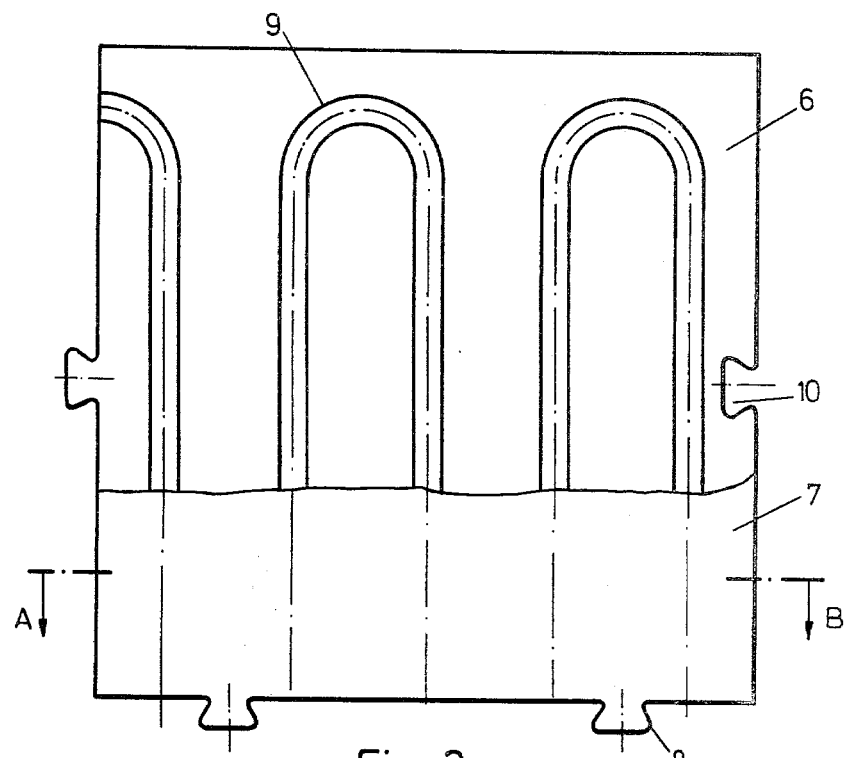
FIG. 2 is a plan view of a plate-like end piece.
Figure 3:
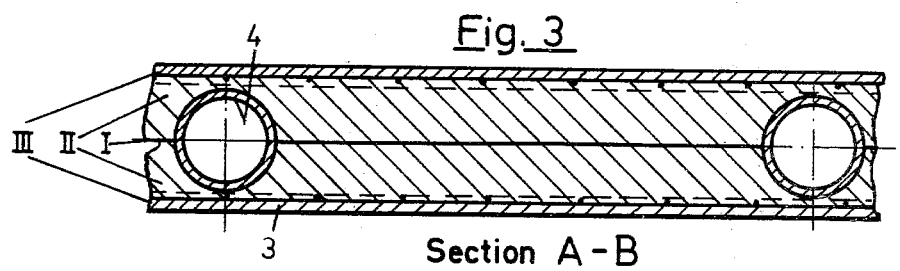
FIG. 3 is a cross sectional view taken along line A-B of FIG. 2.

Referring now in detail to the drawings and, in particular, FIG. 1 thereof, the individual parts of the surface heating device which have to be coupled with each other consist essentially of a cover plate 1 and a base plate 2. Each plate is provided with a reinforcement layer or web for obtaining a sufficient degree of hardness or structural strength. The reinforcement web for the cover plate is indicated by reference number 3 and for the base plate by reference numeral 5. A number of heating pipes 4 are disposed between plates 1. Pipes 4 rest in recesses 9 of cover plate 1 as well as base plate 2. As shown in FIG. 1, the plates are provided with flanges or tongues 8 and corresponding grooves 10 for coupling adjacent heater surface portions together.

Figures 4, 5, 6:
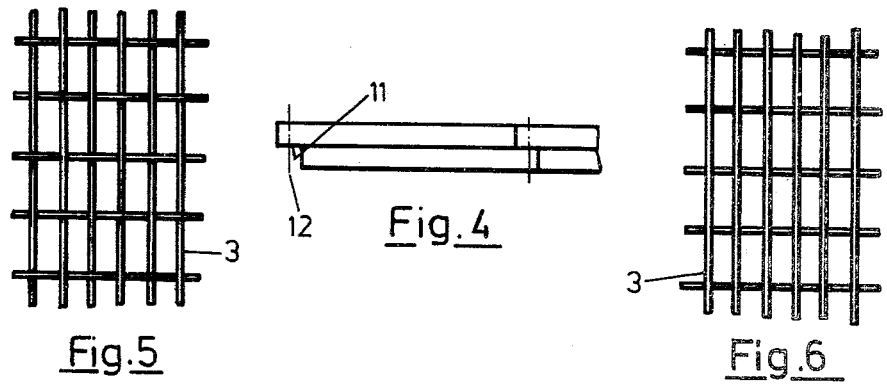
FIG. 4 is a side elevational view of the inventive surface heater showing the offsetting of the cover plate with respect to the base plate for forming interengaging steps.
FIG. 5 is a plan view of interwoven metal threads incorporated into the plates.
FIG. 6 is a plan view of an alternate arrangement of the metal threads showing a cross-wise disposition of welded metal threads.

FIG. 4 illustrates a coupling of the surface portions together with the provision of circumferentially disposed steps. Steps 11 may overlap with respect to each other and rivets 12 may be used to secure the parts together and prevent relative displacement therebetween. The outer floor finishing layers III are the same as layer II, but without porous additives like solid foam, pumice or aerated concrete. In these layers, reinforcement webs are mounted consisting of interwoven (FIG. 5) or welded (FIG. 6) threads 3. An elastic, plastic emulsion may be added to this floor finishing in order to maintain the elasticity of the surface portions. The composition of layer II which consists of a mixture of sand, cement and other porous material additives may be adjusted to meet the permissible surface weight. Furthermore, layers II and III may be made of reinforced aerated concrete.

Bonding layer I between the plates may consist of an epoxy resin, polyurethane or a commonly known floor bonding material. Bonding layer I also encompasses the plastic pipes 4 so that the same is protected from cement alkaline influences and is elastically embedded in the multi-layered structure. An economical manner of assembly is thus provided, since the bonding material can be easily applied to the plates, for example, by means of a roller.

The total height of such a hot water surface heater is about 20 to 25 mm and it can be easily installed into any given room. Therefore, this device satisfies an essential prerequisite for heater installation in old buildings which are to be restored. The inertia of the heating system is considerably reduced, thus achieving a considerable heat advantage with respect to the commonly known wet floor finishing structures. With respect to the wet structure, the dry structure provides superior heating in the technical sense. With these very thin multi-layered structures, a reduction of the operating temperature by about 5°–8° C. is possible, in contrast to a commonly-known floor heating system. This is particularly advantageous when using solar energy or low temperature central heating.

Thus, while only a single embodiment of the present invention has been shown and described, it will be obvious to those persons of ordinary skill in the art, that many changes and modifications may be made thereunto, without departing from the spirit and scope of the invention.

What is claimed is:
1. A hot water surface heating device, comprising:
a plurality of coupled, individually-prefabricated, plate-like assemblies, each of which includes a base plate, a cover plate and at least one plastic pipe disposed between said base plate and said cover plate, said plates each having a reinforcing layer and an inner surface opposing the inner surface of the other plate provided with at least one channel for the partial receipt therein of said at least one pipe and wherein said cover plates of said assemblies are offset with respect to their associated base plates so as to form circumferentially-disposed steps.

2. The heating device according to claim 1, wherein said plates are provided with complimentary-configured mating tongue-and-groove coupling elements at the lateral edges thereof for coupling with the plates of the adjacent assemblies.

3. The heating device according to claim 1, wherein said plates of adjacent assemblies are rigidly secured together in the area of said steps.

4. The heating device according to claim 3, wherein said plates are rigidly secured together by riveting.

5. The heating device according to claim 3, wherein said plates are rigidly secured together by bonding.

6. The heating device according to claim 1, wherein said reinforcement layer comprises mats of threads having a core cross-section of less than 2 mm.

7. The heating device according to claim 6, wherein the ratio of the mesh width amounts to about 1:2 to 1:3 relative to the mesh length at a short side of about 0.5 to 0.8 cm.

8. The heating device according to claim 6, wherein said mat threads are interwoven.

9. The heating device according to claim 6, wherein said mat threads are welded with each other.

10. The heating device according to claim 1, wherein said reinforcement layer comprises mats of threads having a core cross-section between 0.5 to 1.3 mm.

11. The heating device according to claim 1, wherein each of said cover plates are bonded to their associated base plates.

12. The heating device according to claim 1, wherein said cover plates and said base plates each have a three-layered structure comprising an outer layer composed of a finely-grained flooring without porous additives, an intermediate layer composed of a finely-grained flooring with porous additives, and an inner layer composed of floor bonding material.

13. The heating device according to claim 12, wherein said intermediate flooring is admixed with a combination of elements selected from the group consisting of solid foam, pumice and aerated concrete.

14. The heating device according to claim 12, wherein said intermediate flooring is admixed with a member selected from the group consisting of solid foam, pumice and aerated concrete.

15. The heating device according to claim 12, wherein an elastic plastic emulsion is added to the floor finishing.

16. The heating device according to claim 1, wherein said pipe is mounted on said base plate.

* * * * *